(12) United States Patent
Cofler et al.

(10) Patent No.: US 6,754,856 B2
(45) Date of Patent: Jun. 22, 2004

(54) MEMORY ACCESS DEBUG FACILITY

(75) Inventors: Andrew Cofler, Voreppe (FR); Isabelle Sename, Grenoble (FR); Bruno Bernard, Echirolles (FR)

(73) Assignee: STMicroelectronics S.A., Gentilly (FR)

( * ) Notice: Subject to any disclaimer, the term of this patent is extended or adjusted under 35 U.S.C. 154(b) by 718 days.

(21) Appl. No.: 09/748,762

(22) Filed: Dec. 22, 2000

(65) Prior Publication Data

US 2002/0023203 A1 Feb. 21, 2002

(30) Foreign Application Priority Data

Dec. 23, 1999 (GB) ............................................. 9930588

(51) Int. Cl.[7] .......................... G06F 11/00; G06F 9/44; G11C 29/00
(52) U.S. Cl. .......................... 714/53; 714/45; 714/702; 717/124; 717/127; 717/128
(58) Field of Search .............................. 714/29, 30, 34, 714/45, 47, 53, 702; 717/124–130

(56) References Cited

U.S. PATENT DOCUMENTS

| | | | |
|---|---|---|---|
| 5,404,496 A | | 4/1995 | Burroughs et al. |
| 5,430,862 A | | 7/1995 | Smith et al. |
| 5,493,723 A | * | 2/1996 | Beck et al. ................... 703/28 |
| 5,526,485 A | * | 6/1996 | Brodsky ...................... 714/38 |
| 5,544,311 A | | 8/1996 | Harenberg et al. |
| 5,564,041 A | | 10/1996 | Matsui et al. |
| 5,644,703 A | | 7/1997 | Kurakazu et al. |
| 5,715,440 A | | 2/1998 | Ohmura et al. |
| 5,752,013 A | | 5/1998 | Christensen et al. |
| 5,754,839 A | | 5/1998 | Pardo et al. |
| 5,857,094 A | | 1/1999 | Nemirovsky ................. 395/500 |
| 5,978,937 A | * | 11/1999 | Miyamori et al. ............ 714/45 |
| 6,314,530 B1 | * | 11/2001 | Mann ........................... 714/38 |
| 6,453,410 B1 | * | 9/2002 | Satoh ........................... 714/38 |

FOREIGN PATENT DOCUMENTS

| | | | |
|---|---|---|---|
| EP | 0 667 576 | 8/1995 | ........... G06F/11/00 |
| EP | 0 810 519 | 12/1997 | |
| EP | 0 849 674 | 6/1998 | |
| EP | 0 869 434 | 10/1998 | |
| EP | 0 943 995 | 9/1999 | |

OTHER PUBLICATIONS

Standard Search Report from the European Patent Office for the priority British application.
Search Report from the British Patent Office for British Application No. 9930588.0, filed Dec. 23, 1999.
Standard Search Report in connection with British counterpart of U.S. Ser. No. 09/748,785.
Standard Search Report in connection with British counterpart of U.S. Ser. No. 09/748,077.
Standard Search Report in connection with British counterpart of U.S. Ser. No. 09/748,763.
Standard Search Report in connection with British counterpart of U.S. Ser. No. 10/021,269.

* cited by examiner

*Primary Examiner*—Robert Beausoliel
*Assistant Examiner*—Emerson Puente
(74) *Attorney, Agent, or Firm*—Lisa K. Jorgenson; William R. McClellan; Wolf, Greenfield & Sacks, P.C.

(57) ABSTRACT

A computer system includes instruction fetch circuitry for dispatching fetched instructions to a pipelined execution unit, data memory access circuitry and emulator circuitry for use in debug operations, said emulator circuitry including error indicating circuitry to indicate an error in a data memory access operation, snoop circuitry for snooping memory access operation in said data memory access circuitry, synchronising means for synchronising snooped data memory access addresses with respective program counts for the instructions associated with said access addresses, memory mapped storage circuitry responsive to a data memory access error to indicate the data memory address associated with the error, whereby the emulator circuitry may use the data memory address in a subsequent operation to obtain from the synchronising means the specific program count associated with the memory access operation in which the error occurred.

17 Claims, 8 Drawing Sheets

Fig.6.
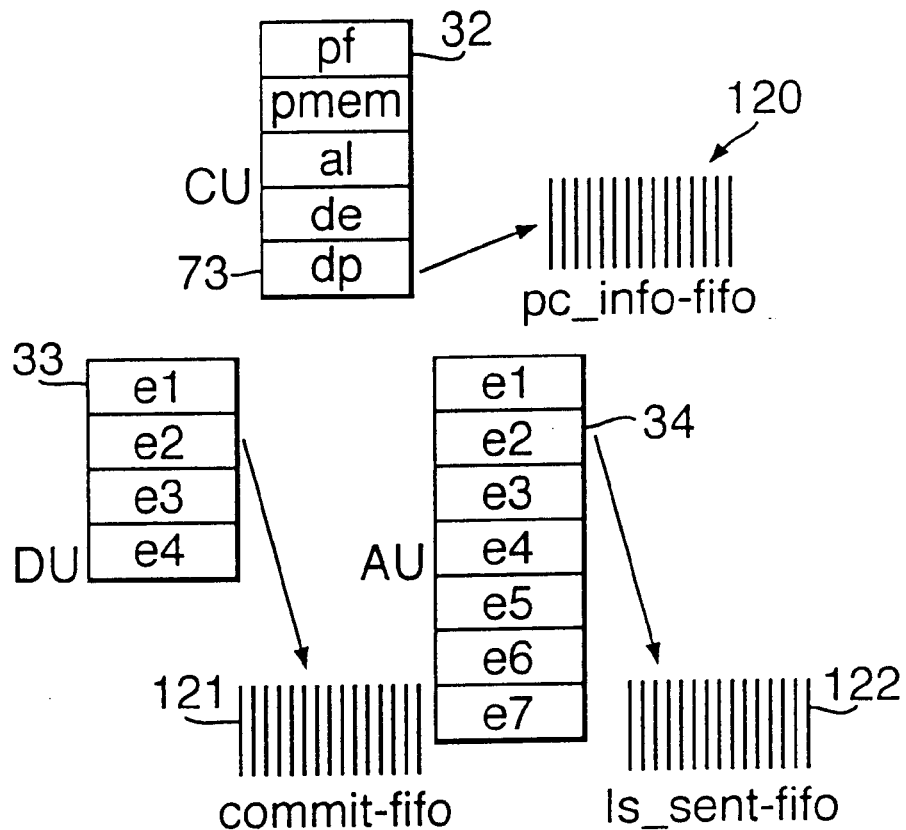
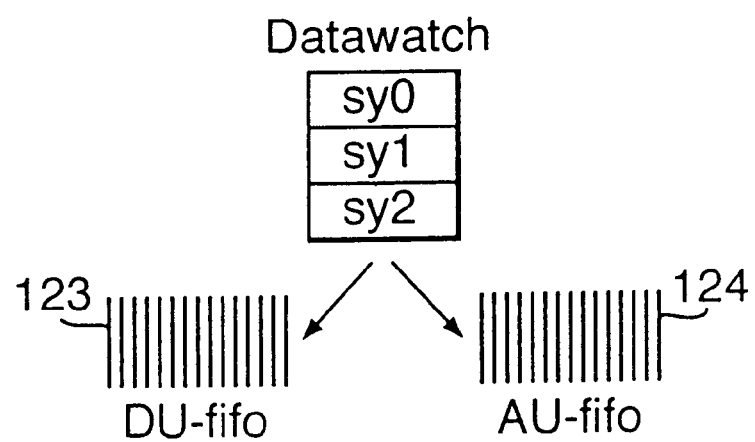

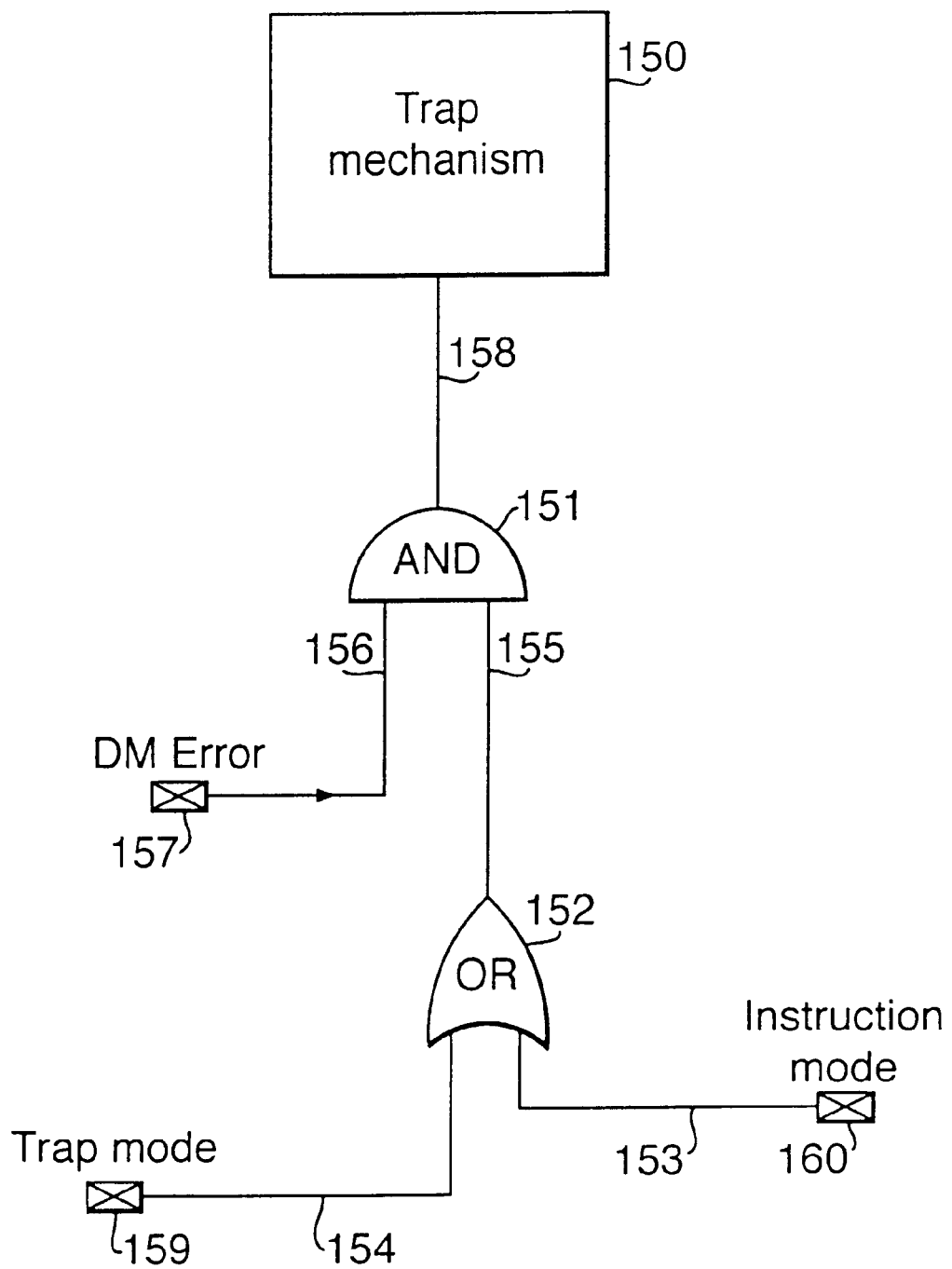

MEMORY ACCESS DEBUG FACILITY

BACKGROUND OF THE INVENTION

The invention may be applied to highly embedded high performance digital processors and debug facilities may be provided on chip. Such digital processors may operate with pipelined execution of instruction sequences together with guard or prediction values such that execution of the instruction depends on resolution of the guard value. It is understood that "prediction" and "guard" have the same meaning and the term "guard" will be used hereafter. In the case of long execution pipelines using guarded instructions the guard value may not be resolved until the instruction is well into the pipeline and has been followed by one or more successive instructions entering the pipeline. For some errors it may be possible to effect synchronisation to identify the exact program count associated with the instruction for which the error arises and thereby set a precise program count watch. In some cases, such as for example the memory access operation, it may not be possible to obtain the program count associated with an error without first identifying the memory access address associated with the error. It will be appreciated that unless the program count of the instruction associated with the error has been identified the debug routine may not be operated prior to execution of the instruction associated with the error.

It is an object of the present invention to provide an improved computer system and method of operating a computer system which permits determination of the program count of an instruction for which an error arises in a data memory access operation.

When an error arises in a memory access operation it may not be possible at the time the error is detected to identify the program count of the instruction which gave rise to the memory access error. In accordance with some embodiments of the invention the memory access address giving rise to the error may be used in a data watch operation to identify the program count of the instruction giving rise to the memory access error and the program count may be used in a precise program count watch.

SUMMARY OF THE INVENTION

The invention provides a computer system for executing a sequence of instructions in at least one pipelined execution unit, said system including instruction fetch circuitry for obtaining instructions from a program memory in accordance with a program count, instruction dispatch circuitry for dispatching fetched instructions to said pipelined execution unit, data memory for use in load and store operations, data memory access circuitry for effecting data memory access operations in response to execution of instructions in said pipelined execution unit, and emulator circuitry for use in debug operations, said emulator circuitry including error indicating circuitry to indicate an error in a data memory access operation, snoop circuitry for snooping memory access operation in said data memory access circuitry, synchronising means for synchronising snooped data memory access addresses with respective program counts for the instructions associated with said access addresses, memory mapped storage circuitry responsive to a data memory access error to indicate the data memory address associated with the error, whereby the emulator circuitry may use the data memory address in a subsequent operation to obtain from the synchronising means the specific program count associated with the memory access operation in which the error occurred.

Preferably the emulator circuitry includes diagnostic circuitry to break the instruction sequence dispatched by the dispatch circuitry in response to detection of an error in a data memory access operation.

Preferably the diagnostic circuitry is operable to generate a precise watch of the program count for use in debugging the data memory access operation by instruction break circuitry to break the instruction sequence dispatched by the dispatch circuitry immediately prior to the instruction identified by said specific program count.

Preferably a trap control circuit is connected to receive an input from said data memory access circuitry and respond to detection of a data memory access error, said trap control circuitry being operable to select whether the instruction sequence dispatched by the dispatch circuitry is interrupted or not.

Preferably the trap control circuitry may select an output signal to generate an imprecise trap for use in debugging the data memory access operation by activating the instruction break circuitry to break the instruction sequence dispatched by the dispatch circuitry when the memory access error is detected.

Preferably the synchronising circuitry comprises a plurality of multivalue buffers, each arranged to hold successive values of respective parameters in an order sequence, one of said parameters being successive program counts and another of said parameters being memory access addresses.

Preferably each of said instructions includes a guard value and one of said buffers is arranged to hold commit indicators after resolution of the guard values of instructions fed to the execution pipeline to indicate whether execution of the instruction is committed.

Preferably a plurality of parallel execution pipelines is provided.

The invention includes a method of executing a sequence of instructions in at least one pipelined execution unit of a computer system, which method comprises fetching instructions from a program memory in accordance with a program count, dispatching fetched instructions to said pipelined execution unit, effecting load and store operations in a data memory through data memory access circuitry, and effecting a debug operation to indicate an error in a data memory access operation by snooping memory access operations in said data memory access circuitry, synchronising snooped data memory access addresses with respective program counts for the instructions associated with said access addresses, indicating in memory mapped storage circuitry a data memory address associated with a data memory access error, whereby the data memory address in said memory map storage circuitry may be used in a subsequent operation to obtain a specific program count associated with the memory access operation in which the error occurred.

Preferably the debug operation is effected by a emulator circuitry having diagnostic circuitry which breaks the instruction sequence dispatched by the dispatch circuitry in response to detection of an error in a data memory access operation.

Preferably, after indicating in memory storage circuitry a data memory address associated with a data memory access error, the debug operation includes executing the instruction sequence and snooping the memory access address indicated by the memory map storage circuitry thereby providing the program count of the instruction associated with the data memory access error.

Preferably the diagnostic circuitry operates to generate a precise watch of the program count for use in debugging the data memory access operation by breaking the instruction sequence dispatched by the dispatch circuitry immediately prior to the instruction identified by the specific program count.

Preferably trap control circuitry receives an input from the data memory access circuitry and is responsive to detection of a data memory access error and selects whether the instruction sequence dispatched by the dispatch circuitry is interrupted or not on detection of the data memory access error.

Preferably the trap control circuitry provides an output signal to generate an imprecise trap for use in debugging the data memory access operation by activating the instruction break circuitry to break the instruction sequence dispatched by the dispatch circuitry when the memory access error is detected.

Preferably the data memory access operations are synchronised with respective program counts by loading into multivalue buffers successive values of respective parameters in an ordered sequence, one of the parameters being successive program counts and another of said parameters being memory access addresses.

Preferably each of said instructions includes a guard value and an instruction commit indicator is stored in one of said multivalue buffers after resolution of the guard value of each instruction to indicate whether execution is committed.

Preferably a plurality of instructions are fetched in a single fetch operation and supplied to a plurality of parallel execution units.

BRIEF DESCRIPTION OF THE DRAWINGS

FIG. 6 illustrates the operation of a plurality of FIFO's in the apparatus of FIG. 5, FIG. 9 shows further details of the device of FIG. 2.

DESCRIPTION OF THE PREFERRED EMBODIMENT

Figure 1:
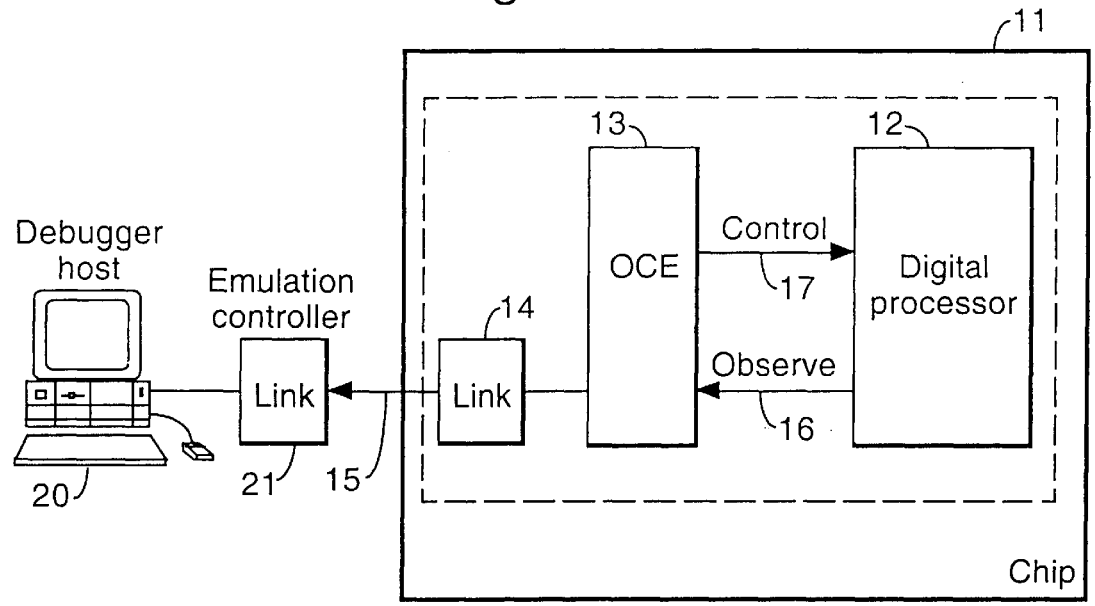
FIG. 1 is a schematic overview of a debugging system applied to a single chip digital processor in accordance with the present invention.

FIG. 1 shows a single integrated circuit chip 11 on which is formed a digital signal processor 12. On the same chip is formed a debugging system in the form of an on-chip emulation device (OCE)13. The emulator 13 is connected through an on-chip link 14 to provide an external connection which may comprise a JTAG port 15. The emulation device 13 may observe various conditions in the digital signal processor 12 by means of a connection 16 and it may control the operation of various units within the digital signal processor 12 by a control connection 17. A debugger host 20 of conventional operation is connected through a link 21 to the port 15 so as to be able to control and observe the on-chip emulator 13. The on-chip emulator 13 can operate autonomously implementing certain control routines through connection 17 in response to observed conditions on line 16. The emulator 13 includes an on-chip emulation program memory which holds debugging code ready for execution by the processor 12 when the emulator 13 has control of the processor 12. The connection through the port 15 also allows the processor 12 to be controlled directly by the off-chip debugger host 20 via the links 14 and 21.

Figure 2:
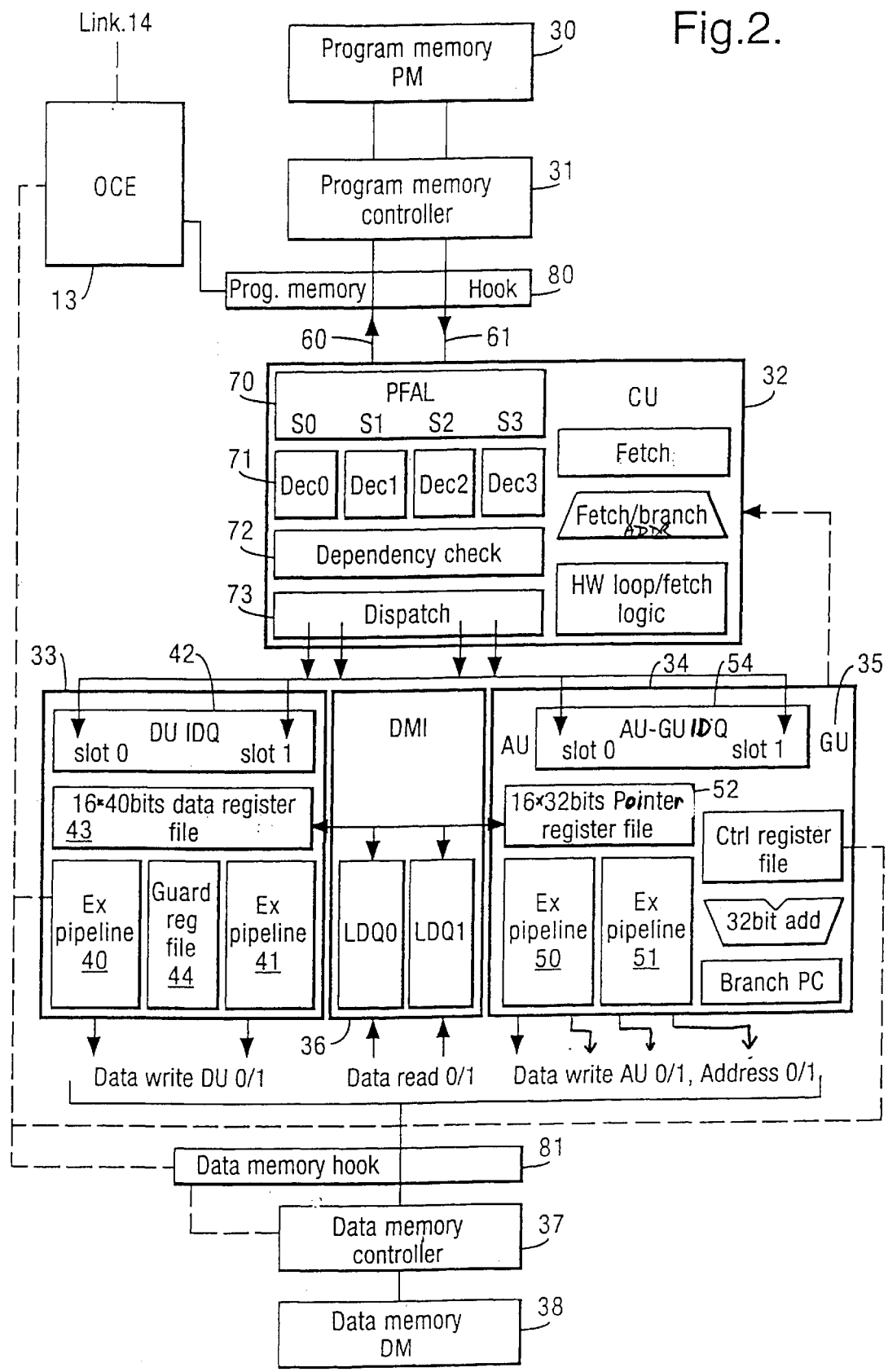
FIG. 2 illustrates in more detail components of the single chip digital signal processor and on-chip emulation system.

More detail of the processor 12 is shown in FIG. 2. The main units of the processor 12 comprise a program memory 30, a program memory controller 31, a control unit 32, a data execution unit 33, an address execution unit 34 together with a general execution unit 35, a data memory interface 36, a data memory controller 37 and a data memory 38. The data execution unit 33 has two parallel execution pipelines 40 and 41 representing slot 0 and slot 1 for the data unit 33. The unit also includes an instruction dispatch queue 42 for the two execution pipelines as well as a common data register file 43 and a guard register file 44 holding the architecturally correct values of the guards which are supplied with instructions to either the data unit 33 or address unit 34 or general unit 35. The guard register file 44 is systematically updated by both the data unit and the address unit. Similarly the address unit 34 includes two execution pipelines 50 and 51 for executing instructions in slot 0 or slot 1 of the address unit. The unit also includes a common pointer register file 52. Instructions are fed to the two pipelines 50 and 51 from a common instruction dispatch queue 54. The general unit 35 includes a pipelined execution unit which may derive instructions from the instruction dispatch queue 54 and may be used for generating branch addresses for instruction fetches. The data unit 33 is used for executing arithmetic operations and includes add and multiply and accumulate circuitry. The address unit 34 is used for executing memory access instructions and includes some arithmetic circuitry. Similarly the general unit 35 includes some arithmetic circuitry. The supply of instructions to slot 0 or slot 1 of the data unit 33 and address unit 34 is controlled by the control unit 32. This unit is operable to generate an instruction fetch address determined by a program count (PC). This is supplied on line 60 through the program memory controller 31 to address the program memory (PM) 30. In this case a 16 byte (128 bit) line is fetched from the memory 30 in each fetch operation. This may include instructions in three different modes as will be described below. The fetched line is supplied through the memory controller 31 into the control unit 32 from line 61. The instructions in the program memory may be arranged in GP16 mode in which case each instruction is 16 bits long. Alternatively GP32 mode may be used in which each instruction is 32 bits long. VLIW instruction mode is also available in which case four 32 bit long instructions are incorporated in the single fetch operation. The control unit 32 receives the instruction line from the memory 30 and supplies micro instructions to the instruction dispatch queues 42 or 54 of the data unit 33 or address unit 34. The manner in which the control unit generates the microinstructions from the instruction line received via connection 61 will be described with reference to FIG. 2. Generally, the control unit 32 has a program fetch align unit 70 which determines which instructions in slots S0–S3 of the fetched line from memory 30 are to be aligned for simultaneous dispatch to the data or address unit. These instructions forming a single line for dispatch are decoded by decode circuitry 71 and after a dependency check on those instructions by circuitry 72 microinstructions are generated in a dispatch unit 73 connected to the inputs to the data unit 33 and address unit 34.

When the OCE 13 is not in use, the control unit 32 will fetch instructions from the program memory 30 in accordance with a program count determined by the control unit 32. The instructions will be fed sequentially into the execution pipelines of the data unit 33 and address unit 34. Those instructions will include guard values which will be resolved within the pipelines of the data unit 33. It will be understood that if the guard value is resolved as false, then the instruction will not be executed although it has entered the pipeline. Once circuitry 73 has dispatched an instruction into one of the execution pipelines the instructions will proceed through the remaining stage of the pipeline even though the resolution of the guard value may cause the execution unit to treat the instruction as a non-operation NOP. The execution of instructions in the normal manner may require accesses for load or store into the data memory 38 and this can be carried out through the data memory controller 37 which includes a plurality of queues for load or store operations. In some cases the address and/or data for storing may be supplied to the data memory controller 37 before resolution of the guard values so that the final memory access may be dependent on supply of the resolved guard value to the data memory controller 37. Data which is to be loaded from the data memory 38 may be fed to load data queues in the data memory interface 36 prior to loading into registers of the data unit 33 or address unit 34 dependent on the resolved guard value.

The emulator 13 is required to provide a trace or profile of program counts used in both linear and jump program sequences. It may be required to set up a number of hardware break points such as program count watch points, data watch points or register watch points. It may also set up software break points and provide a data trace or profile. It may also cause program stall and step-by-step execution and provide a time stamp facility.

Figure 3:
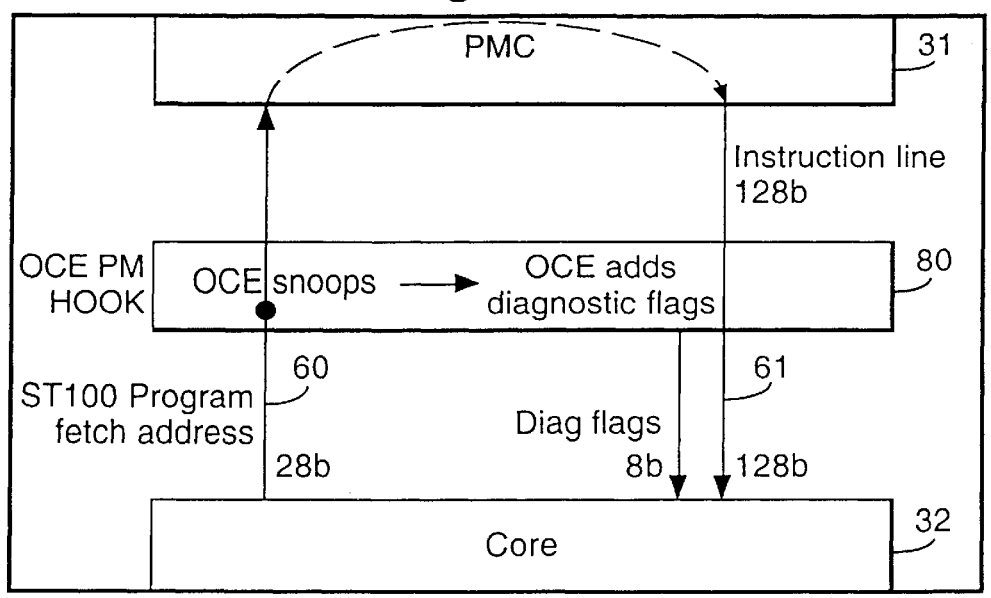
FIG. 3 illustrates in more detail part of the apparatus of FIG. 2.

In order to provide a trace of all the program count values of instructions which are fetched, it is necessary to distinguish between those instructions which are received by the control unit 32 and those for which execution is completed after resolution of the guard values. It will be appreciated that the program fetch operation can be considered as speculative as it is not known at that time whether the guard value will be resolved in such a way that the instruction will be executed within the pipeline. If the guard value resolution causes the instruction to be executed then the instruction is herein referred to as "committed". The emulator 13 needs to be able to recover the program count of all instructions that enter the pipeline as well as the associated guard value and other information so as to reconstruct program count traces for all committed instructions. To do this, the emulator 13 must snoop all program fetch operations as shown in FIG. 3. The emulator 13 is connected to program memory hook circuitry 80 which snoops the fetch address on line 60 supplied to the program memory controller 31 from the control unit 32. If circuitry 80 which snoops the fetch address on line 60 supplied to the program memory controller 31 from the control unit 32. If the emulator 13 requires a watch on a fetch address supplied on line 60 then it causes the hook circuit 80 to add diagnostic flags to the instruction line supplied on line 61. As already explained, the instruction line fetched from memory 30 is 128 bits but the hook circuit 80 adds an additional 8 bits in the form of diagnostic flags to indicate to the control unit 32 how the program line which has been fetched is to be handled in the generation of microinstructions within the control unit 32 and what interaction with the OCE 13 is required.

Figure 4:
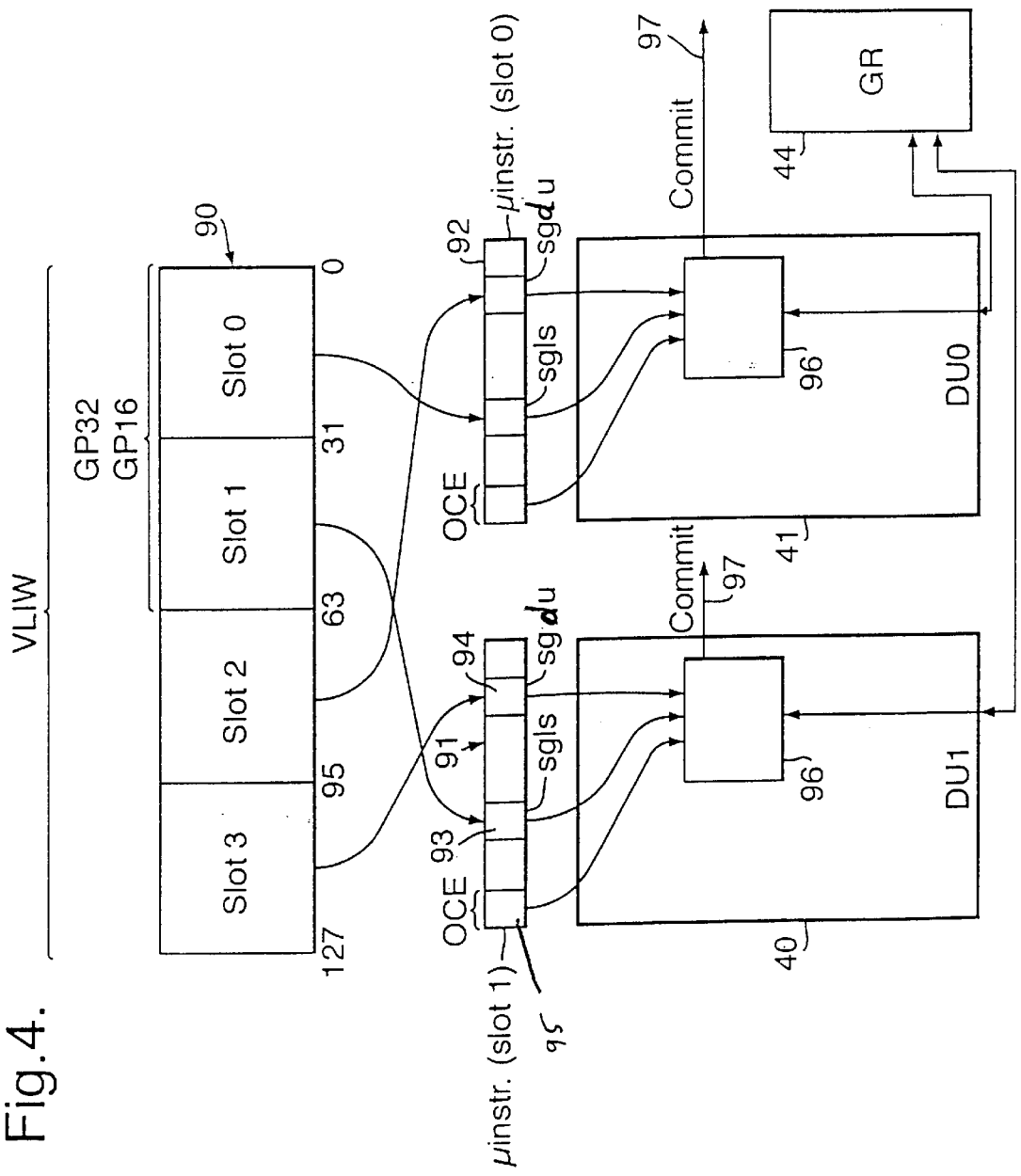
FIG. 4 illustrates the way in which microinstructions are generated and supplied to part of the apparatus of FIG. 2.

FIG. 4 illustrates one fetched line 90 from the program memory having four slots—slot 0–slot 3 each of 32 bits. When the processor is operating in VLIW mode, this line includes four 32 bit instructions which will be fed to the processor simultaneously. In the case of GP16 mode, the line will include two instructions in each slot whereas in GP32 mode one instruction will be located in each slot. Although multiple instructions are included in the slots of line 90, in GP16 and GP32 mode only two instructions are aligned and used to generate microinstructions for feeding simultaneously into the execution pipelines. It is only in the case of VLIW instructions that instructions from all four slots are aligned and supplied simultaneously to the execution units. In that case two instructions will be supplied to the two pipelines of the data unit and two instructions will be supplied to the pipelines of the address unit. The format of each Data Unit microinstruction is illustrated at 91 and 92 in FIG. 4. Each of these microinstructions is of similar format and has a plurality of fields some of which indicate the Opcode of the instruction and some indicate source and destination registers for values used in execution of the instruction. To handle the guard values with each instruction, each of these microinstructions has two separate guard value fields. Field 93 is provided for a guard value associated with a load store operation and field 94 has a guard indicator for the arithmetic operation of the data unit. The provision of the diagnostic flags added as an additional 8 bits to the signal on line 61 fed to the control unit 32 will cause the microinstruction generation to include four OCE bits in field 95. These OCE bits are used to effect control required by the emulator 13 and may include the supply of various values to the OCE 13. In the event of a VLIW instruction being fetched when the emulator 13 wishes to carry out a watch, the guard values for each of the four instructions in line 90 are supplied to the microinstructions for the data unit although of course two of the instructions will be executed by the pipelines within the address unit. This is illustrated in FIG. 4 where the guard value from slot 0 is fed to field 93 of the microinstruction used for slot 0 of the data unit 33. The guard value of slot 1 of line 90 is fed to field 93 of the microinstruction supplied to slot 1 of the data unit 33. The guard value of slot 2 of line 90 is fed to field 94 of the microinstruction fed to slot 0 of the data unit 33. The guard value of slot 3 of line 90 is supplied to field 94 of the microinstruction supplied to slot 1 of the data unit 33. In this way, all four guard values are supplied to the data unit where the guard value can be resolved by reference of the guard indicators to the master guard register file 44 in the guard unit. This is done by circuitry 96 within each execution unit of the data unit 33 so as to provide a commit output signal 97 in the event of the guard indicator being resolved as a true guard value thereby requiring execution of the instruction, the commit output 97 has the value 1. For a guard resolved as false, the commit output would be zero.

Figure 5:
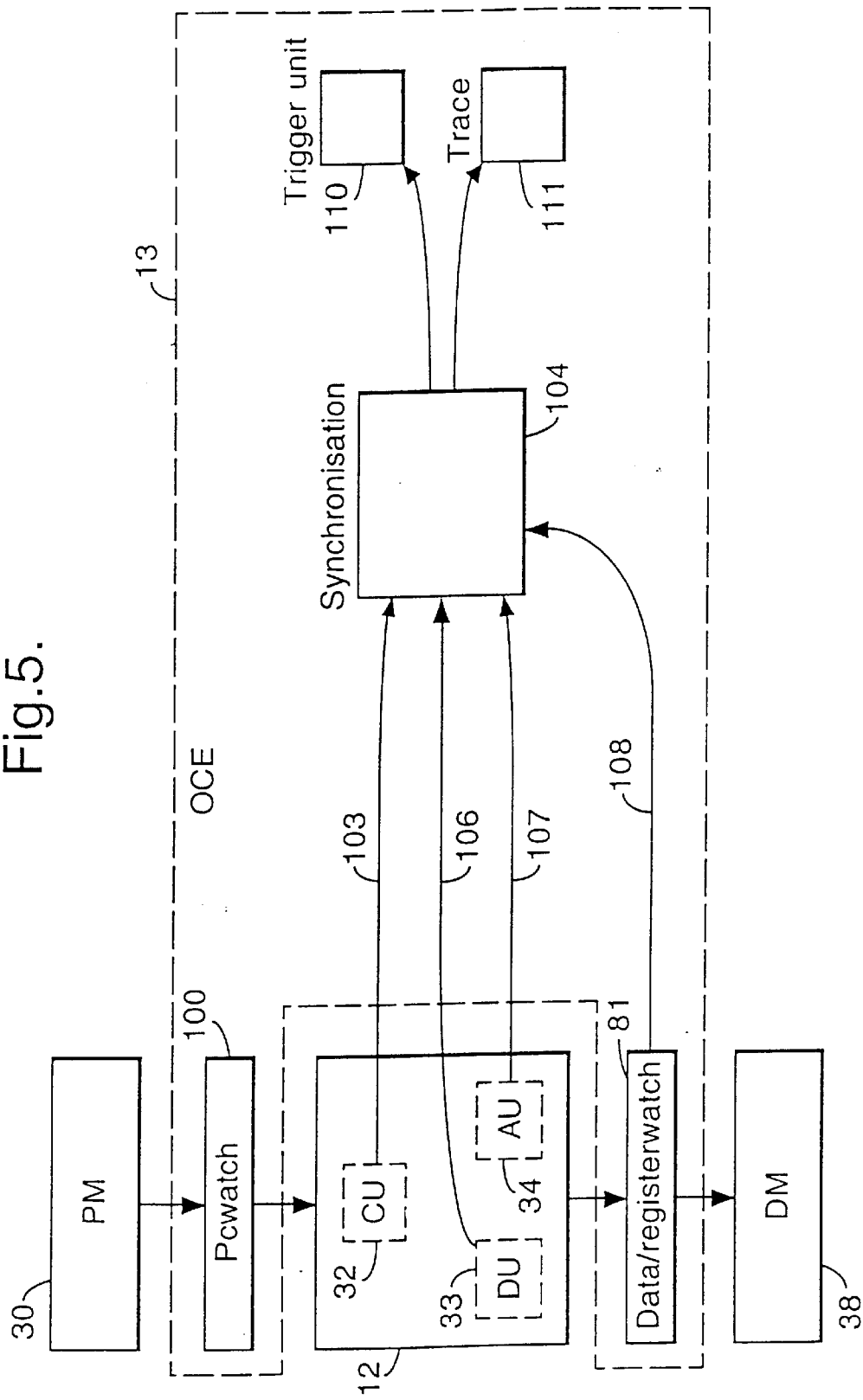
FIG. 5 shows schematically the supply of signals from the apparatus of FIG. 2 to the on-chip emulator.
Figure 8:
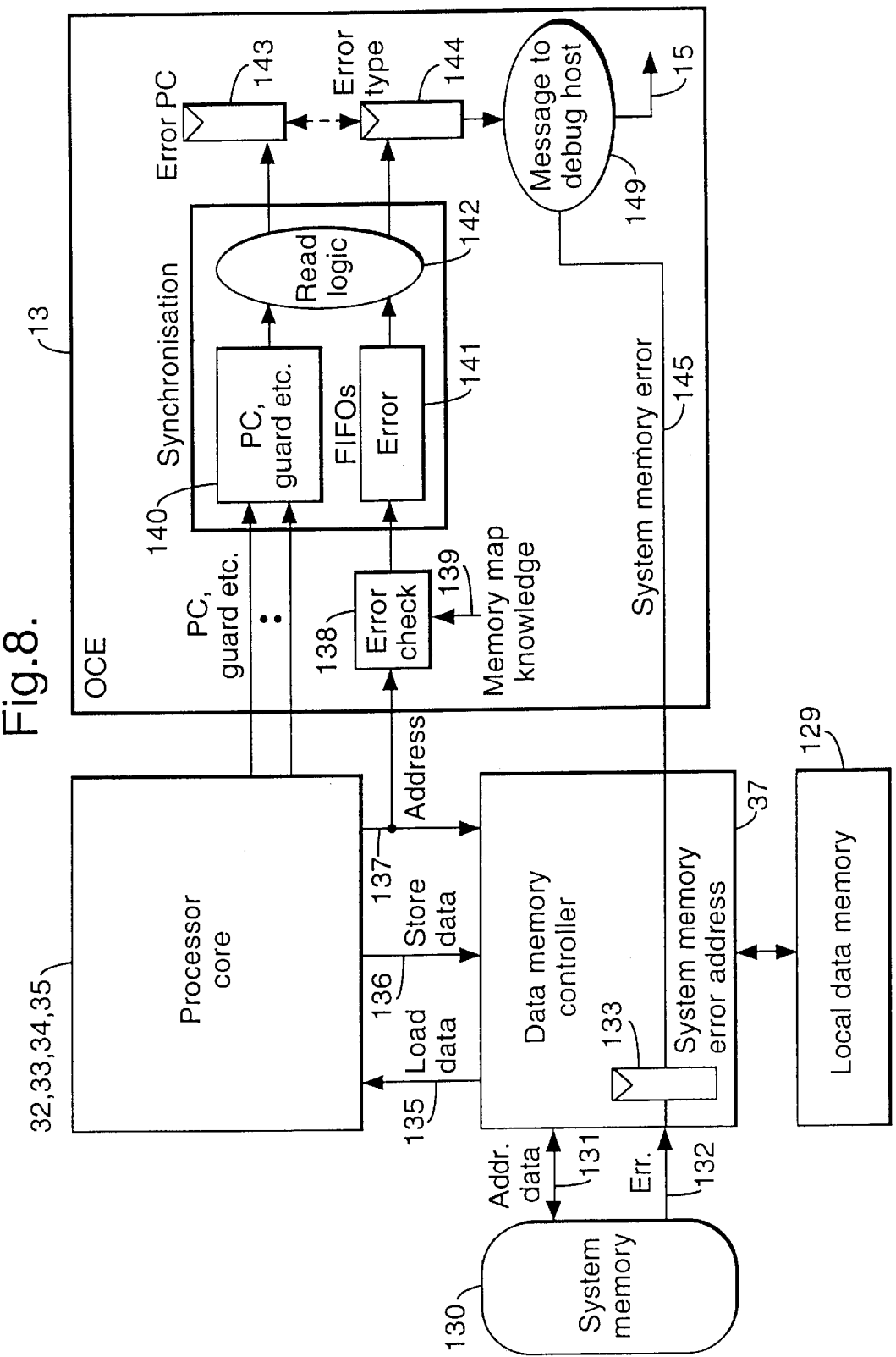
FIG. 8 shows more detail of the use of the device of FIG. 2 in data memory error detection.

In operation of the emulator 13, it may carry out various watches on events occurring within the processor. This is illustrated in FIG. 5 in which the emulator 13 is shown as carrying out a program count watch 100 on instructions fetched from the program memory and supplied to the control unit 32. It may also watch data accesses (load or store) between the core and the data memory via the data memory controller. This is shown in FIG. 5 as a data/register watch 81 which may watch addresses used for data memory accesses in the local data memory or errors in a system memory as shown in FIG. 8. The data/register watch of FIG. 5 is carried out by a data memory hook 81 as shown in FIG. 2. Indications of the program count which has been watched are supplied by the control unit 32 on line 103 to a synchronisation unit 104. A commit signal of zero or one is generated by the data unit 33 when the guard value has been resolved by the data unit thereby indicating whether the instruction is executed or not. The commit signal is provided on line 106 to the synchronisation unit 104. Line 106 corresponds to line 97 of FIG. 4. Similarly when a load or store operation is executed by the address unit 34 a signal is provided on line 107 to the synchronisation unit 104 to indicate if a load or store is sent or not sent to the memory controller 37. A watch hit on particular addresses and/or data values is provided on line 108 to the synchronisation unit 104. The synchronisation unit comprises a plurality of FIFO's which will be described with reference to FIG. 6. The output of the synchronisation unit 104 is fed to a trigger unit 110 which processes the diagnostic events. It also supplies an output to a trace unit 111 in order to establish a required trace in the emulator 13.

The mechanism used in the synchroniser 104 will be explained with reference to FIG. 6. As instructions are fed through the pipeline of the control unit 32, instructions are output by the dispatch stage 73 which supplies to a program count FIFO (first in first out buffer) 120 an indication of the program count and an indication if the instruction is a load or store instruction. As the instruction passes through the pipeline stages of the data unit 33 the guard value is resolved by hardware provided in the data unit for the normal execution of instructions in the data unit and is not additional hardware for use solely by the debugging operation. In this example the resolution is shown as occurring at stage e2 in the pipeline and the commit signal indicating whether the guard value is resolved as true or false is supplied to a commit FIFO 121. When a load/store instruction is executed in the pipeline within the address unit 34 a signal is sent to a load-store-sent FIFO 122 to indicate whether or not the load/store has been sent by the address unit to the data memory controller 37. FIFO 120 receives its signals on line 103 of FIG. 5. FIFO 121 receives its signals on line 106 of FIG. 5. FIFO 122 receives its signals on line 107 in FIG. 5. Similarly, the data watch 101 watches an address or data value to detect hits on inputs to the data memory controller 37 from the data unit and/or the address unit. It provides outputs on lines 108 to the respective data unit FIFO 123 or address unit FIFO 124 to indicate whether hits have been detected or not from the respective data or address units. Signals on line 108 of FIG. 5 supply hit or miss signals to the FIFOs 123 and 124.

The timing of the synchronisation system 104 will be explained with reference to FIG. 7. The cycles of operation of instruction fetches, execution pipelines and memory accesses are controlled by clock cycles with a clock signal as shown at 130 in FIG. 7. The Figure illustrates seven successive clock cycles and in this example the program count of the instruction dispatch by circuitry 73 occurs in cycle 2 as shown in the program count line 131. The commit signal is sent out in cycle 4 as shown in line 132. The load/store signal from the address unit is provided in cycle 5 as shown in line 133. The address comparison for the load store is carried out in cycle 7 as shown in line 134 and in this example the data comparison is carried out in cycle 8 as shown in the data comparison line 135. It will be appreciated that the signal on line 131 was fed into FIFO 120. The signal on line 132 was fed into FIFO 121. The signal on line 133 was fed into FIFO 122. The signal on line 134 was fed into FIFO 124. The data signal from line 135 is fed into FIFO 123. Each of the FIFO's 120, 121, 122, 123 and 124 operate on synchronised clock cycles from the clock signal shown in FIG. 7. Each of the FIFO's 120–124 is then read in clock cycle 9 as shown by lines 136, 137, 138, 139 and 140 in FIG. 7. The result of reading each of those FIFO's on the same clock cycle 9 will indicate correlation between a commit signal and any of the events watched on lines 131–135. The emulator 13 can therefore through use of the synchronisation circuitry 104 establish the program count which was associated with a committed instruction and one which gave rise to a watched event by either the PC watch 100 or data or register watch 101. The synchronisation unit 104 may operate the trigger unit 110 or trace unit 111 or both of these units in order to carry out the required debugging operation and provide the required trace or profile.

Figure 7:
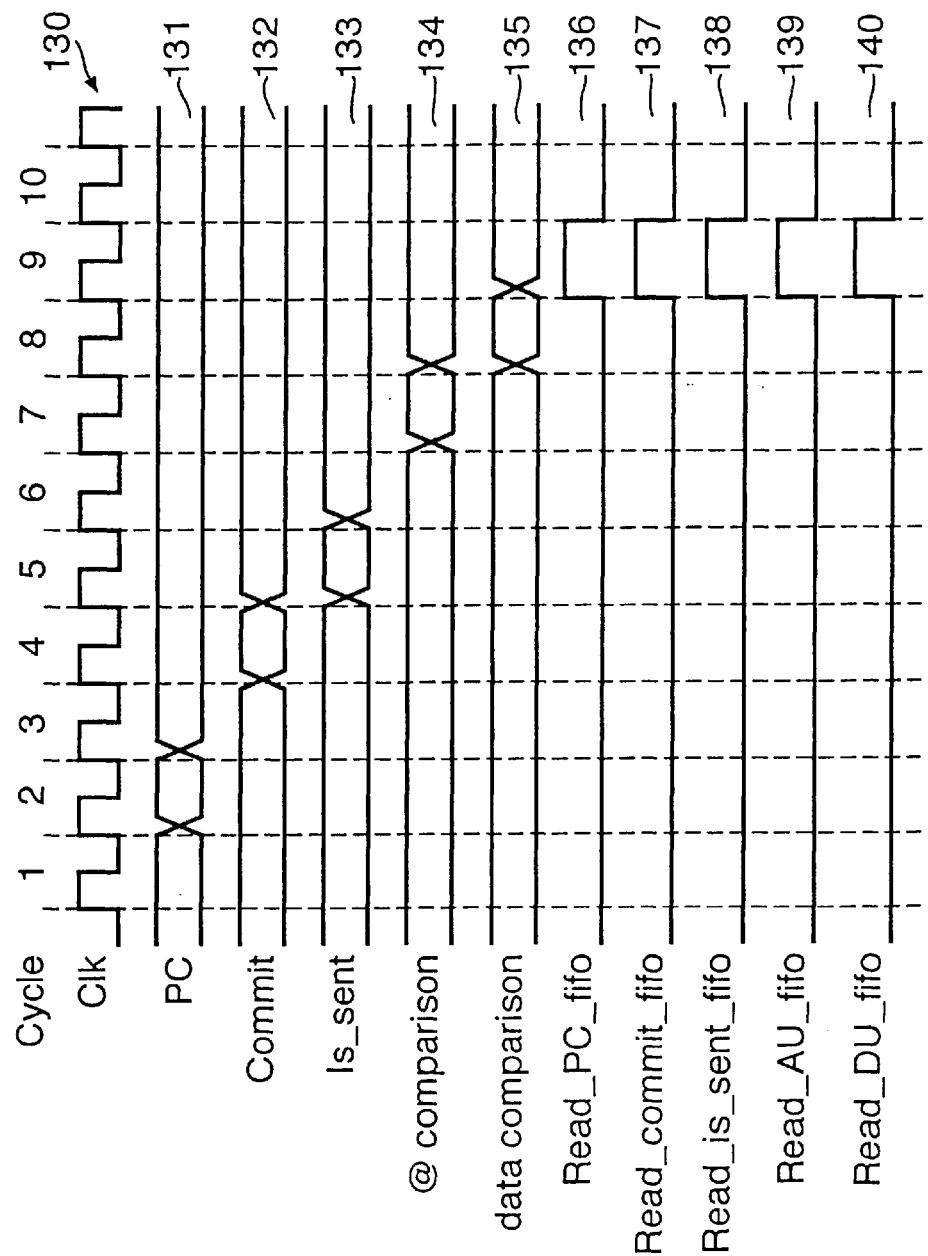
FIG. 7 illustrates a timing diagram for the operation of the apparatus of FIGS. 5 and 6.

In the example of FIG. 7 the data watch was carried out on a store operation for the contents of a data unit register. It will however be appreciated that store operations may be carried out on the contents of an address unit register and in that event, the address unit will output the address and the data to be stored on the same cycle of operation. When the store operation relates to data held in a data unit register, the address unit will output the address on a different cycle from the data unit outputting the data which is to be stored. For this reason separate FIFOs 123 and 124 are provided for the data watch unit. These FIFOs 123 and 124 only store whether there has been an address or data hit and they do not give the address or data itself. When hits are detected, the emulator 13 only needs to check FIFOs 123 and 124 if the program count FIFO 120 has indicated that there is a load/store instruction and the FIFO 122 confirms that the load/store has been sent by the address unit to the data memory controller 37.

It will be understood that in the above example each of the FIFOs provides a buffer for holding entries as an ordered queue. Read and write operation may occur on clocked cycles so as to take the oldest entry from the queue or to add a newest entry to the queue. Each buffer may receive a read or write command which may be selectively activated in synchronism with a clock. Each FIFO has a full and empty signal generator either indicating that there is no further queue space or that the buffer is empty. Each of the units shown in FIG. 5 for providing signals to the synchronisation buffers 104 may write its data into its corresponding FIFO on any clock cycle when it has resolved the data that it wishes to write into the FIFO. It is however important that each stage write its successive data values into its respective FIFO in an ordered manner so that resynchronisation is effected by the emulator circuitry by reading out of the relevant FIFOs when all the data is ready so reading out of the relevant FIFOs when all the data is ready so that the values read out all correspond to the same order position in the queues held by each FIFO. For example, when the instruction dispatch stage writes program count values into FIFO 120, a number of entries will be made in FIFO 120 before the data unit is able to write the first commit value into the commit FIFO 121. For a few cycles, the program count FIFO 120 will progressively accumulate data while the commit FIFO 121 remains empty with its empty signal active The emulator circuitry reads the empty signals as these indicate if there is any data. As soon as the commit FIFO is written with its first data the empty signal deactivated and the emulator logic can read out of the PC FIFO 120 and the commit FIFO 121 simultaneously. It thereby obtains the first program count value and the first commit value which are resynchronised. The execution of instructions in the core of the processor 12 operates in an in-order manner so that the FIFOs shown in FIG. 6 always receive their data in order with respect to the program flow.

The emulator 13 may cause the control unit 32 to divert the next program fetch by responding to diagnostic flags to cause deviation of the next program fetch address on line 60 so as to obtain instructions from a debug program memory rather than the normal program memory 30 or to re-run program for which an error such as a data memory access error was detected. The re-run may be required after the synchronising unit 104 has provided the PC count of the instruction associated with the error, thereby allowing a precise trap to be operated to handle the error.

Many different software errors may imply that the computer system cannot proceed in the manner defined by the instruction sequence. Such errors may arise for various reasons including for example instructions fetched from the program memory which are not recognised by the decoder, program or data memory accesses that are misaligned in the memory spaces or attempt to access unknown memory locations, the instruction sequence may form part of a thread having insufficient status for instruction execution or memory access, translation misses may occur when using virtual memory addressing or floating point problems may arise. In response to any such errors the hardware may respond by a trap to enable debugging to be effected. Precise trapping requires that all instructions prior to the trapped instruction have been completed but the trapped instruction and none of its successors have been executed so that the architectural state of the machine has not been corrupted by execution of the trapped instruction or any later instruction. Imprecise trapping arises when the trap is raised only after the error has occurred. The architectural state of the machine is likely to have been corrupted and the instruction thread should therefore be treated as void and restarted. In the case of an imprecise trap the programmer does not have a precise indication of the exact location of the error as the program counter when the trap is raised may be very far removed from the program count of the instruction that caused the error. In the following description a precise trap is one which is raised when the trapped instruction and none of its successors have been executed and an imprecise trap is one in which the trap is raised later in the instruction sequence than the instruction that caused the error.

It will be appreciated that in the computer system of FIG. 2, the instructions are executed in lengthy pipelines and generally errors which are revealed deep in the pipelines cannot produce precise traps. Once instructions have been dispatched by unit 73 it is not possible to stop their progress through the execution pipelines although of course the completion of their execution may depend on the resolution of the associated guard values. However, errors associated with data memory accesses cannot in general produce precise traps as other instructions will normally have entered the execution pipelines after the instruction giving rise to the error.

FIG. 8 shows more detail of the circuitry provided for a data memory access. The data memory consists of a local data memory 129 and a system memory 130 connected to the data memory controller 37 through system memory buses 131. The buses provide addresses and data on lines 131 between the system memory and the controller 37. Any error signal in a system memory is provided on line 132. The emulator circuitry 13 includes a plurality of system memory mapped registers of which one is marked 133 and for convenience is shown as part of the data memory controller 37. In FIG. 8 the data memory controller 37 is connected to the control unit, data unit and address unit shown in FIG. 2 by means of a load data line 135, a store data line 136 and a memory access address line 137. The address line 137 is also connected to a error check circuit 138 in the emulator 13 which is provided at input 139 with knowledge of the local memory map for checking if any error in a local memory access occurs. The emulator 13 has synchronisation circuitry 104 as already described with reference to FIGS. 5 and 6. In addition to FIFOs 140 for values already described with reference to FIG. 7, it includes an error FIFO 141. The FIFOs 140 and 141 are connected to read logic 142 for associating errors with respective PC values where the synchronisation circuitry has been able to provide a PC value for the instruction causing the error. Logic 142 provides the PC of the instructions causing errors in a latched buffer 143 together with indications of the error type in a latched buffer 144. An output is provided on line 15 to the debug host to enable appropriate action to be taken to effect debugging. The data memory controller 37 provides an output on line 145 from the memory map registers 133 directly to the debug host interface 149 in the emulator circuit 13 to indicate the access address in the system memory for any error so that in cases where the synchroniser 104 is not able to indicate the PC of the instruction causing the error, the emulator circuitry will receive an indication of the system memory access address for which the error occurred. This will allow the emulator 13 to carry out a data watch 101 for the address indicated by the register 133 and thereby use the synchroniser 104 to watch the address of the memory access giving rise to the error and indicate the program count for that error. Once the program count for the error is known the instruction thread may be rerun carrying out a program count watch through the hook 80 of FIG. 2 and thereby raise a precise trap halting execution of the instruction immediately before the instruction giving rise to the error.

In the example of FIG. 2, the control unit 32 may arrange for different modes of instruction dispatch. In normal execution mode the dispatch unit 73 continues to dispatch instructions into the execution pipeline so that more than one instruction is in the same pipeline at the same time. It may alternatively operate in one instruction at a time mode in which case only one instruction is allowed in an execution pipeline at any one time. In normal execution mode, the instructions are supplied at normal full speed and traps are not generated for data memory errors. The emulator circuitry 13 permanently snoops the data memory controller interface provided by lines 135, 136 and 137 and detects errors by the error checking circuitry 138 or receives an indication of a system memory error via lines 132 and 145. The emulator circuitry 13 is able to indicate on output 15 details of the error. If the error occurs on a store access, the access operation will be nullified in the data memory controller 37 and in the case of a load operation, an error will return invalid data to the core.

The core may also operate in a "one instruction at a time" mode, the control unit only issues one instruction at a time into the pipeline; the following instruction is only issued when the preceding one has fully completed execution. In this way, it can raise precise traps for data memory errors. It will be appreciated that this execution mode results in a much lower instruction throughput and is therefore only useful for debug purposes.

Errors associated with data memory accesses may be classified dint two types, type 1 and type 2. Type 1 errors encompass errors where the exact characteristics of the memory may are known and normally correspond to accesses to the local data memory. These errors are of the type:

attempted access to outside implemented local data memory space, mis-aligned access etc.

Type 2 accesses are errors for which the emulator circuitry 13 is dependent on how the data memory controller 37 and the system memory 130 responds to a memory access. The synchronizer 104 may not be able to supply the program count of the instruction which gave rise to the error. However in this case the memory address in the system memory 130 which gave rise to the error will be latched in register 133 which is accessible by the debug host. The error is only validated if the associated guard is resolved true so that the memory access will update the architectural state of the machine. Registers 143 and 144 autolock so as to maintain details of the first detected error until appropriate debugging action has been taken. These registers could be extended to hold more than one error.

In normal operation, the program flow is not stopped when an error is detected but the programmer is informed by the debug host that an error has been associated with a data memory access and the necessary information on the type of error and its location is provided by the emulator circuitry 13. The programmer receives this information later than the actual occurrence of the error.

In the case of type 1 errors above, the synchroniser provides the program counter in which the error has occurred and this allows the programmer to carry out a visual check of the code to see if there is an obvious error. Alternatively the instruction thread may be restarted with a precise program count watch with a break point placed on the program count value corresponding to the instruction for which the error has arisen. The program is stopped immediately before that instruction is dispatched into the execution unit and the debugger may then obtain details of all the processor registers and key parts of the memory space before the instruction with the error is executed. In some cases the device may be operated in one instruction at a time mode with precise trapping at the error.

If the error is data dependent, it may be necessary to set an imprecise trap by use of the circuitry shown in FIG. 9. This shows trap mechanism 150 together with an AND gate 151 and OR gate 152 forming part of the decoder circuitry. The OR gate 152 is arranged to have a first input 153 from an execution mode indicator or a second input 154 from a trap mode indicator. The output of the OR gate 152 forms a first input 155 to the AND gate 151. A second input 156 from an error indicator 157. The output of the AND gate 158 is operable to initiate action of the trap mechanism 150 and thereby break the sequence of instruction dispatch and if required setting a new instruction fetch indicator. The trap mode indicator 159 is an input pin provided in the decoder circuitry to allow the operator to select the setting of an imprecise trap when an error is detected. If the signal from 159 is set to an imprecise trap one output is provided to the AND gate 151 and on occurrence of an error by the error indicator 157, the trap mechanism is activated. If the pin 159 is not activated to indicate an imprecise trap, then detection of the error at 157 will only cause a trap to be set if the execution mode indicator 160 is set to indicate a condition requiring a trap to be set on detection of the error. That will be the case if the control unit is set to the one instruction at a time mode allowing only a single instruction in a pipeline. When the circuitry of FIG. 9 is operated to raise imprecise traps (input trap mode 159 is high) an imprecise trap is raised by the core for all data memory errors. The diagnostic hardware 13 also may be operated in a mode in which it diverts the normal program flow as soon as it detects a data memory access error. The divert will occur a number of cycles after the error has occurred but it does allow a review of the processor registers and key parts of the memory space after the imprecise trap has been set. The programmer can examine the relevant data to determine why the error has occurred.

In the case of type 2 errors above, the emulator circuitry 13 will record the memory address that created the system bus error, the debugging circuitry can then be operated to stop execution of the program sequence and to rerun the program setting a data watch on the address giving rise to the memory access error. The synchroniser 104 will then provide the exact program count of the instruction that created that error and the program can then be rerun with a program count (PC) watch on the fetch operation of that instruction and a precise (PC) watch set to terminate execution of the instruction sequence immediately before execution of the instruction associated with the error. This may be followed by a program divert control by the debugging circuitry.

The invention is not limited to the details of the foregoing example.

What is claimed is:

1. A computer system for executing a sequence of instructions in at least one pipelined execution unit, said system including instruction fetch circuitry for obtaining instructions from a program memory in accordance with a program count, instruction dispatch circuitry for dispatching fetched instructions to said pipelined execution unit, data memory for use in load and store operations, data memory access circuitry for effecting data memory access operations in response to execution of instructions in said pipelined execution unit, and emulator circuitry for use in debug operations, said emulator circuitry including error indicating circuitry to indicate an error in a data memory access operation, snoop circuitry for snooping memory access operation in said data memory access circuitry, synchronising means for synchronising snooped data memory access addresses with respective program counts for the instructions associated with said access addresses, memory mapped storage circuitry responsive to a data memory access error to indicate the data memory address associated with the error, whereby the emulator circuitry may use the data memory address in a subsequent operation to obtain from the synchronising means the specific program count associated with the memory access operation in which the error occurred.

2. A computer system according to claim 1 in which the emulator circuitry includes diagnostic circuitry to break the instruction sequence dispatched by the dispatch circuitry in response to detection of an error in a data memory access operation.

3. A computer system according to claim 2 in which the diagnostic circuitry is operable to generate a precise program count watch for use in debugging the data memory access operation by instruction break circuitry to break the instruction sequence dispatched by the dispatch circuitry immediately prior to the instruction identified by said specific program count.

4. A computer system according to claim 1 in which a trap control circuit is connected to receive an input from said data memory access circuitry and respond to detection of a data memory access error, said trap control circuitry being operable to select whether the instruction sequence dispatched by the dispatch circuitry is interrupted or not.

5. A computer system according to claim 4 in which the trap control circuitry may select an output signal to generate an imprecise trap for use in debugging the data memory access operation by activating the instruction break circuitry to break the instruction sequence dispatched by the dispatch circuitry when the memory access error is detected.

6. A computer system according to claim 1 in which the synchronising circuitry comprises a plurality of multivalue buffers, each arranged to hold successive values of respective parameters in an order sequence, one of said parameters being successive program counts and another of said parameters being memory access addresses.

7. A computer system according to claim 6 in which each of said instructions includes a guard value and one of said buffers is arranged to hold commit indicators after resolution of the guard values of instructions fed to the execution pipeline to indicate whether execution of the instruction is committed.

8. A computer system according to claim 1 in which a plurality of parallel execution pipelines is provided.

9. A method of executing a sequence of instructions in at least one pipelined execution unit of a computer system, which method comprises fetching instructions from a program memory in accordance with a program count, dispatching fetched instructions to said pipelined execution unit, effecting load and store operations in a data memory through data memory access circuitry, and effecting a debug operation to indicate an error in a data memory access operation by snooping memory access operations in said data memory access circuitry, synchronising snooped data memory access addresses with respective program counts for the instructions associated with said access addresses, indicating in memory mapped storage circuitry a data memory address associated with a data memory access error, whereby the data memory address in said memory map storage circuitry may be used in a subsequent operation to obtain a specific program count associated with the memory access operation in which the error occurred.

10. A method according to claim 9 in which the debug operation is effected by a emulator circuitry having diagnostic circuitry which breaks the instruction sequence dispatched by the dispatch circuitry in response to detection of an error in a data memory access operation.

11. A method according to claim 10 in which, after indicating in memory storage circuitry a data memory address associated with a data memory access error, the debug operation includes executing the instruction sequence and snooping the memory access address indicated by the memory map storage circuitry thereby providing the program count of the instruction associated with the data memory access error.

12. A method according to claim 11 in which the diagnostic circuitry operates to generate a precise watch of the program count for use in debugging the data memory access operation by breaking the instruction sequence dispatched by the dispatch circuitry immediately prior to the instruction identified by the specific program count.

13. A method according to claim 9 in which trap control circuitry receives an input from the data memory access circuitry and is responsive to detection of a data memory access error and selects whether the instruction sequence dispatched by the dispatch circuitry is interrupted or not on detection of the data memory access error.

14. A method according to claim 13 in which the trap control circuitry provides an output signal to generate an imprecise trap for use in debugging the data memory access operation by activating the instruction break circuitry to break the instruction sequence dispatched by the dispatch circuitry when the memory access error is detected.

15. A method according to claim 9 in which the data memory access operations are synchronised with respective program counts by loading into multivalue buffers successive values of respective parameters in an ordered sequence, one of the parameters being successive program counts and another of said parameters being memory access addresses.

16. A method according to claim 15 in which each of said instructions includes a guard value and an instruction commit indicator is stored in one of said multivalue buffers after resolution of the guard value of each instruction to indicate whether execution is committed.

17. A method according to claim 9 in which a plurality of instructions are fetched in a single fetch operation and supplied to a plurality of parallel execution units.

* * * * *

UNITED STATES PATENT AND TRADEMARK OFFICE
CERTIFICATE OF CORRECTION

PATENT NO. : 6,754,856 B2
DATED : June 22, 2004
INVENTOR(S) : Andrew Cofler, Isabelle Sename and Bruno Bernard It is certified that error appears in the above-identified patent and that said Letters Patent is hereby corrected as shown below:

Title page,
Item [57], ABSTRACT,
Line 4, should read:
-- use in debug operations, the emulator circuitry including --
Lines 7 and 8, should read:
-- memory access operation in the data memory access circuitry, synchronizer for synchronising snooped --
Line 10, should read:
-- counts for the instructions associated with the access --
Line 15, should read:
-- operation to obtain from the synchronizer the spe --

Column 12,
Line 43, should read:
-- whereby the emulator circuitry uses the data memory --

Column 13,
Line 33, should read:
-- storage circuitry is used in a subsequent operation to --

Signed and Sealed this

Seventeenth Day of August, 2004

JON W. DUDAS
*Acting Director of the United States Patent and Trademark Office*